(12) United States Patent
Saleem et al.

(10) Patent No.: US 8,958,750 B1
(45) Date of Patent: Feb. 17, 2015

(54) PEAK DETECTION METHOD USING BLIND SOURCE SEPARATION

(71) Applicants: King Fahd University of Petroleum and Minerals, Dhahran (SA); King Abdulaziz City for Science and Technology, Riyadh (SA)

(72) Inventors: Zahid Saleem, Dhahran (SA); Samir Al-Ghadhban, Dhahran (SA); Tareq Y. Al-Naffouri, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 42 days.

(21) Appl. No.: 14/025,763

(22) Filed: Sep. 12, 2013

(51) Int. Cl.
*H04B 15/00* (2006.01)
*H04B 17/00* (2006.01)
*H03F 1/26* (2006.01)
*H04B 1/10* (2006.01)

(52) U.S. Cl.
CPC ...... *H04B 1/1027* (2013.01); *H04B 2001/1045* (2013.01)
USPC .......................... 455/62; 455/67.11; 702/190

(58) Field of Classification Search
USPC ......... 455/62, 67.11, 67.13; 327/58; 702/189, 702/190, 196; 324/130 R
See application file for complete search history.

(56) References Cited

U.S. PATENT DOCUMENTS

| | | | |
|---|---|---|---|
| 7,085,711 B2 | 8/2006 | Kadambe | |
| 2009/0268962 A1* | 10/2009 | Fearon et al. | 382/168 |
| 2011/0213566 A1 | 9/2011 | Kopriva et al. | |

FOREIGN PATENT DOCUMENTS

CN    101951619 A    1/2011

* cited by examiner

*Primary Examiner* — Nguyen Vo
(74) *Attorney, Agent, or Firm* — Richard C Litman

(57) ABSTRACT

The peak detection method using blind source separation extracts true peaks from noisy peaks in a more robust way that does not require any a priori information. Information regarding true peak location is obtained by thresholding the output of a wavelet transform. The value of the threshold is dependent on noise variance. While noise variance is normally unknown, the present method implements a blind source separation technique to calculate the noise variance. The blind source separation technique does not require information of the incoming signal or the channel noise, and hence is suitable for CR (cognitive radio) peak detection.

10 Claims, 4 Drawing Sheets

PEAK DETECTION METHOD USING BLIND SOURCE SEPARATION

BACKGROUND OF THE INVENTION

1. Field of the Invention

The present invention relates to ultra-wideband signal processing, and particularly to a peak detection method using blind source separation.

2. Description of the Related Art

Efficient utilization of radio spectrum has gained recent attention. It has been observed that utilization of spectrum by licensed wireless systems, for instance TV broadcasting, is quite low. Transition from voice only data services to multimedia services requires high data rates. Current static frequency allocation schemes cannot cope forever with increasing data rates. Some frequency bands are overcrowded, and some are barely used. A spectrum occupancy measurement project concluded that the average spectrum occupancy over multiple locations is 5.2%, with a maximum of 13.1%.

Cognitive radio (CR) seems a tempting solution to resolve the perceived bandwidth scarcity versus under-utilization dilemma. CR uses opportunistic usage of bands that are not crowded by licensed users. They use spectrum sensing to sense the frequency bands that are unoccupied by licensed users and transmit on these bands to avoid harmful interference to licensed users.

CRs front end architecture is dependent on spectrum utilization. For spectrum utilization under 20%, a wideband architecture for the CR front end is suggested. The observed spectrum consists of numerous frequency bands. Power spectral density (PSD) within each frequency band is smooth. Transition of PSD from one band to another band is considered as irregularities in PSD. Such irregularities can be studied using wavelet transforms, which are capable of characterizing local regularity of a signal.

Applying a wavelet transform on an incoming signal results in peaks at locations where signal PSD is irregular. Irregularity could be a jump or a fall in PSD, depicting the change of frequency band. Jump depicts that the next user has higher PSD than the current one, whereas fall shows that the next user has lower PSD than the current one, or it could also be a vacant band. When the incoming signal is noisy, these peaks are accompanied by noisy peaks. In some known methods, multiscale wavelet products are used to extract true peak information. This technique requires multiplication of various wavelet transform gradients (for the same signal). As a result of this, true peaks will be enhanced, whereas random noisy peaks will be suppressed. However this technique requires a priori knowledge regarding the total number of occupied bands in a spectrum at a given instance. This information is normally unknown to CR.

Thus, a peak detection method using blind source separation solving the aforementioned problems is desired.

SUMMARY OF THE INVENTION

The peak detection method using blind source separation extracts true peaks from noisy peaks in a more robust way that does not require any a priori information. Information regarding true peak location is obtained by thresholding the output of a wavelet transform. The value of the threshold is dependent on noise variance. While noise variance is normally unknown, the method implements a blind source separation technique to calculate the noise variance. The blind source separation technique does not require information of the incoming signal or the channel noise, and hence is suitable for CR peak detection.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The peak detection method using blind source separation extracts true peaks from noisy peaks in a more robust way that does not require any a priori information. Performing spectrum sensing using a wavelet edge detection technique provides edges (peaks) that contain information regarding the start and end locations of a frequency band. In the presence of noise, there is a mixture of true peaks and noisy peaks. Knowledge of noise variance is required to extract true peaks efficiently from the mixture. Information regarding true peak location is obtained by thresholding the output of the wavelet transform. The value of the threshold is dependent on noise variance. Noise variance is also normally unknown. Here, a blind source separation technique is implemented to calculate the noise variance. Blind source separation does not require information of the incoming signal or the channel noise, and hence is suitable for CR peak detection.

Figure 1:
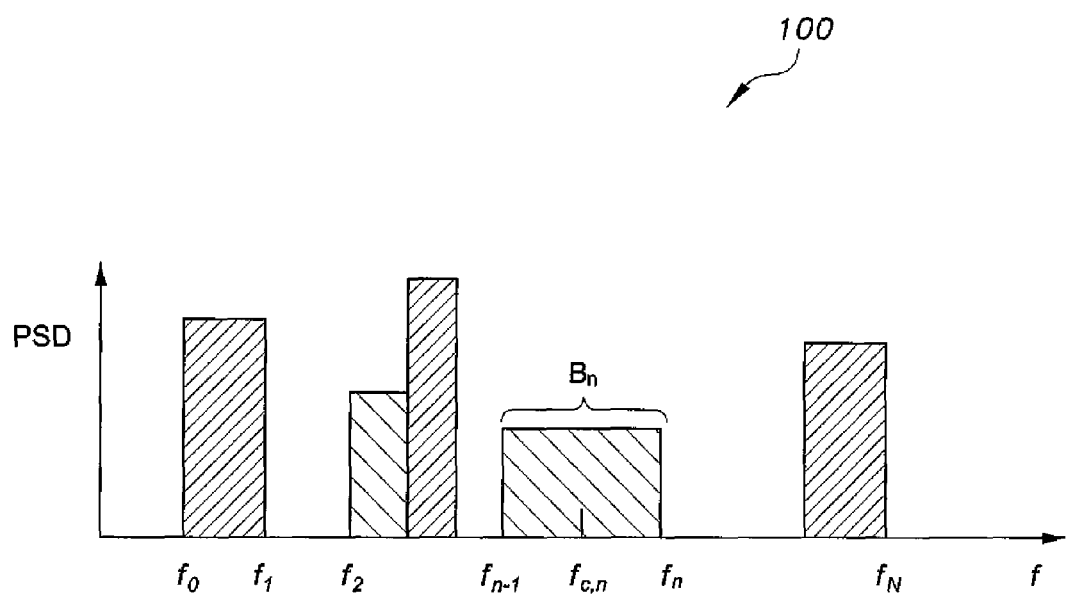
FIG. 1 is a chart showing PSD (power spectral density) of an incoming signal.

The PSD (power spectral density) of an incoming signal is flat within each band, and transition occurs at the beginning of a new band. Plot 100 of FIG. 1 illustrates the PSD structure of an incoming signal. Hence, spectrum sensing can be considered as an edge detection problem. These edges provide the information of the start and end locations of a frequency band.

The continuous wavelet transform of an incoming signal is given as follows:

$$W_s S_r(f) = S_r(f) * \phi_s(f), \tag{1}$$

where $\phi_s(f)$ is the dilated wavelet smoothing function and '*' defines the convolution operator. The variable 's' depicts the dilation factor of the wavelet smoothing function, and it takes values in terms of power of 2. A common example of a wavelet smoothing function is Gaussian function. For detection of edges, the first derivative of the wavelet transform can be used, which is given as:

$$W'_s S_r(f) = s \frac{d}{df}(S_r * \varphi_s)(f) = S_r * \left(s \frac{d}{df}(\varphi_s)\right)(f). \quad (2)$$

Local maxima of the first derivative provide information of edges, which corresponds to the start and end locations of a frequency band. We can take a second derivative of equation (2), and we can detect these edges. But with the second derivative, we have to look for zero crossings, not the local maxima. Once the frequency boundaries, i.e., are $\{f_n\}_{n=0}^{N-1}$, are detected, then the next step is to calculate the PSD within each band and decide about the presence or absence of a primary user. Calculation of the PSD is given as follows:

$$\beta_n = \frac{1}{f_n - f_{n-1}} \int_{f_{n-1}}^{f_n} S_r(f) df. \quad (3)$$

Blind source separation has found very useful applications in the area of signal processing and neural networks. Blind source separation does not require knowledge of the channel and the transmitted signal. In fact, its goal is to recover the unobserved signals, i.e., 'source signals', from a set of observed signals. The term 'Blind' refers to the fact that the source signals are not observed, and the fact that there is no a priori knowledge available about the mixing system.

Since the development of the blind source separation technique, many new algorithms have been formulated for various problems. Some of these techniques depend on exploiting the second-order statistics and stationary or non-stationary conditions of the received signal, while others need higher order statistics and some exploitations of the time-frequency diversities. All these algorithms obtain a cost function through some optimization process, which normally is computationally complex.

In a known blind source separation algorithm, the maximum signal-to-noise ratio (SNR) can be achieved when sources are separated completely. The cost function of this algorithm is based on the SNR definition. This algorithm achieves a low computational complexity solution based on an instantaneous mixing method. The assumption is that source signals come from different sources and could be considered as statistically independent. The received signal can be written as:

$$x_i(t) = \Sigma_{j=1}^n a_{ij} s_j(t), \quad (4)$$

where $a_{ij}$ represents the instantaneous mixing matrix (i, j) element. In vector form, we can write (4) as:

$$x(t) = As(t), \quad (5)$$

where x(t) is a vector of mixed signals.

BSS algorithms have information of mixed signals and the statistical independence property of the source signals. Assuming W is an un-mixing matrix for the aforementioned problem, the BSS problem can be stated as follows:

$$y(t) = Wx(t) = WAs(t), \quad (6)$$

where y(t) is the estimate of the source signals, i.e., s(t). The difference between the original signal and the estimated signal is the noise signal. Thus, the SNR may be defined as:

$$SNR = 10\log \frac{s \cdot s^T}{e \cdot e^T} = 10\log \frac{s \cdot s^T}{(s-y)\cdot(s-y)^T}. \quad (7)$$

Optimized processing of equation (7) results in an Eigenvalue problem. The resultant Eigenvalue matrix corresponds to the un-mixing matrix W. Once the un-mixing matrix is calculated, the source signals can be obtained using equation (6). The un-mixing matrix calculation is given as follows:

$$(xx) \times W = ((\hat{x}-x)(\hat{x}-x)^T) \times W \times D, \quad (8)$$

where $\hat{x}$ is the moving average estimate of x. For energy detection, the received signal can be written in terms of its sample covariance matrix, i.e.:

$$R_x(N) = R_s(N) + \sigma^2 I, \quad (9)$$

where $$R_x(N) = \frac{1}{N}\sum_{n=0}^{N-1} x(n)x^T(n),$$

and $$R_s(N) = \frac{1}{N}\sum_{n=0}^{N-1} s(n)s^T(n)$$

are the received and transmitted signal sample covariance matrices, respectively. Also, $\sigma^2$ is the noise variance.

Since we do not have information regarding the transmitted (or source) signal, we cannot calculate the transmitted signal sample covariance matrix. The blind source separation algorithm can calculate the un-mixing matrix for the received signal. Using un-mixing matrix and received signal, we can estimate the transmitted signal as shown in equation (6) and its corresponding sample covariance matrix. Noise variance can be calculated as:

$$\sigma^2 I = \frac{1}{N}\sum_{n=0}^{N-1} x(n)x^T(n) - \frac{1}{N}\sum_{n=0}^{N-1} Wx(n)x^T(n)W^T. \quad (10)$$

Figure 2:
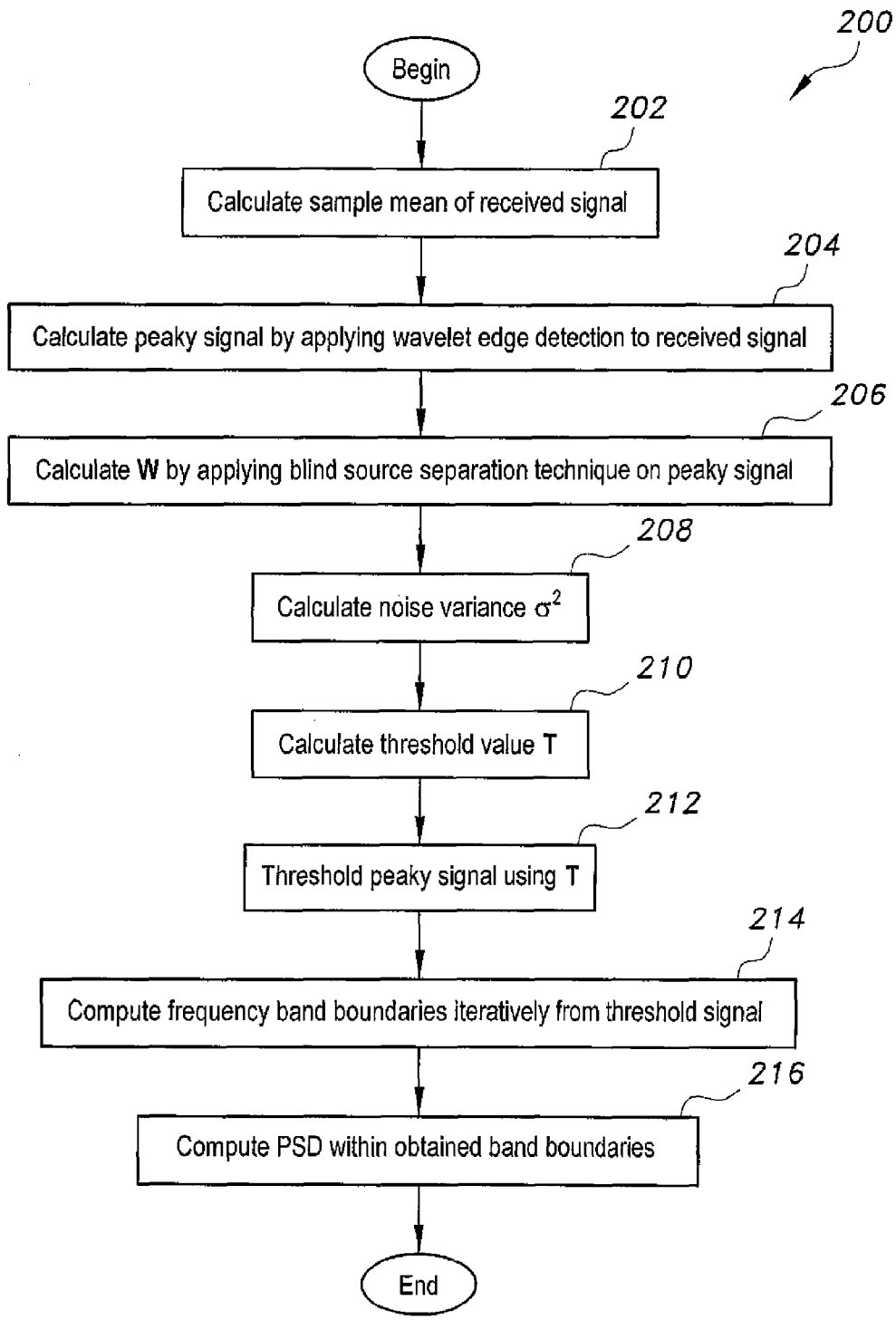
FIG. 2 is a flowchart illustrating the peak detection method using blind source separation according to the present invention.

In our case, signal x is the output of the wavelet edge detection technique. Noise variance is not sufficient to threshold one such signal. In order to calculate exact threshold values, we have to normalize noise variance with the sample mean of the received signal. Hence, the threshold value can be written as:

$$T = \frac{\sigma^2}{\frac{1}{N}\sum_{n=0}^{N-1} |r(n)|}, \quad (11)$$

where r represents the received signal. Using T, we can threshold the output of the edge detection technique, and hence can calculate the frequency edge locations. The present peak detection method 200 is illustrated in FIG. 2 and summarized in Table 1.

TABLE 1

Peak Detection Method

| Step | Action |
|------|--------|
| 202 | Calculate the sample mean of received signal. |
| 204 | Apply edge detection technique to the received wideband signal to get the peak signal that contains information regarding frequency band boundaries. |
| 206 | Apply blind source separation technique on peak signal to calculate W. |
| 208 | Calculate noise variance using equation (10). |
| 210 | Calculate threshold value T using equation (11). |
| 212 | Threshold the output of edge detection technique using T. |
| 214 | Compute the frequency band boundary locations (i.e., start and end) iteratively from the output of previous step. |
| 216 | Compute PSD within these frequency band boundaries. |

Here we assume that our wideband signal of interest lies in the range of $[0,1000]\Delta$ Hz, where $\Delta$ is frequency resolution. We also assume that during the transmission there are total of $N=11$ bands in the wideband signal with frequency boundaries $\{f_n\}_{n=0}^{10}=[0, 100, 119, 300, 319, 500, 519, 700, 719, 900, 919, 1000]$. Out of these eleven bands, only five bands are carrying primary user transmission and the remaining six bands are available for secondary users, i.e., they are spectrum holes. In the simulation, we used a Gaussian wavelet for the edge detection technique.

Figure 3:
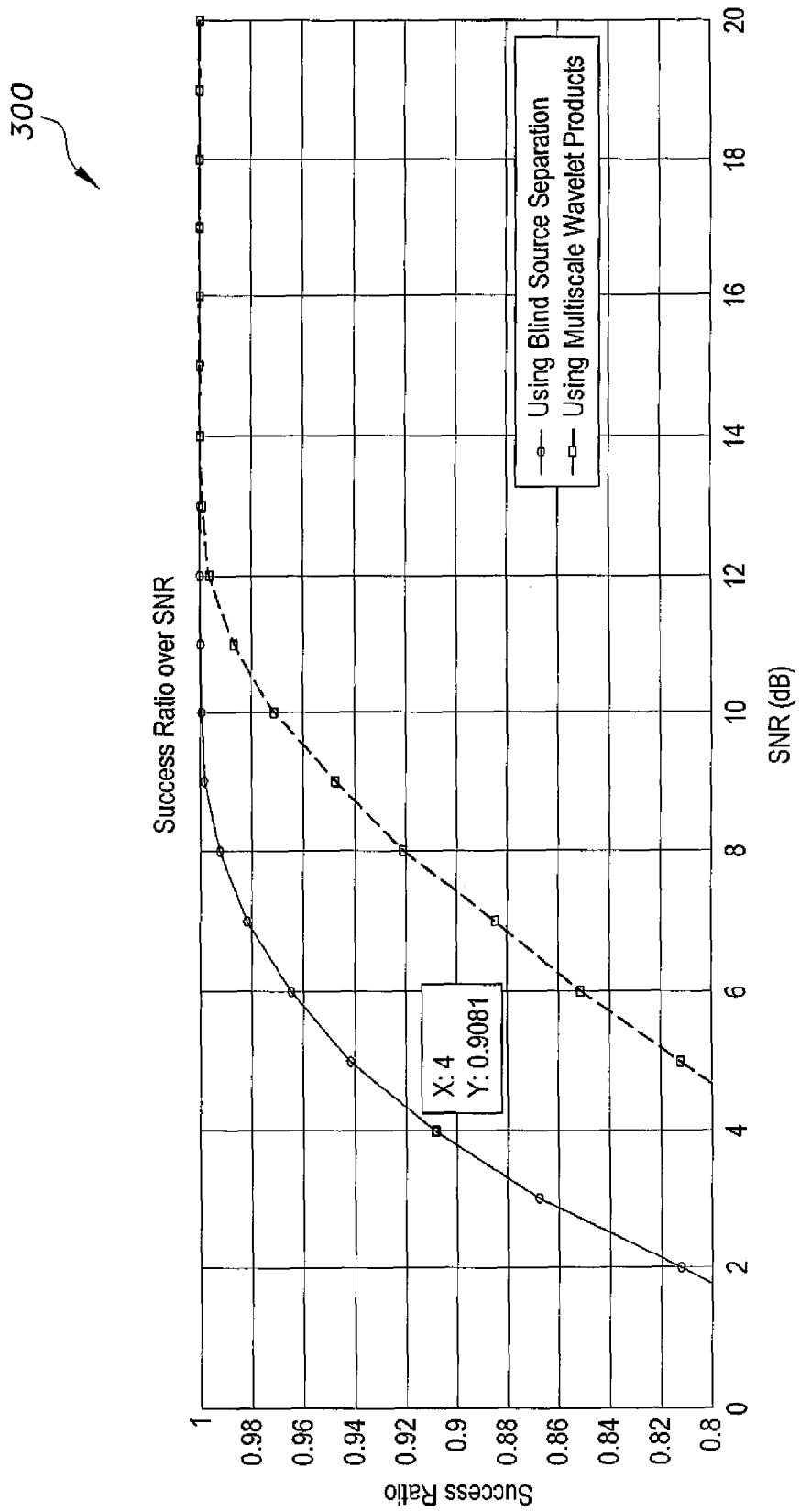
FIG. 3 is a plot showing success ratio versus SNR for the peak detection method using blind source separation according to the present invention.
Figure 4:
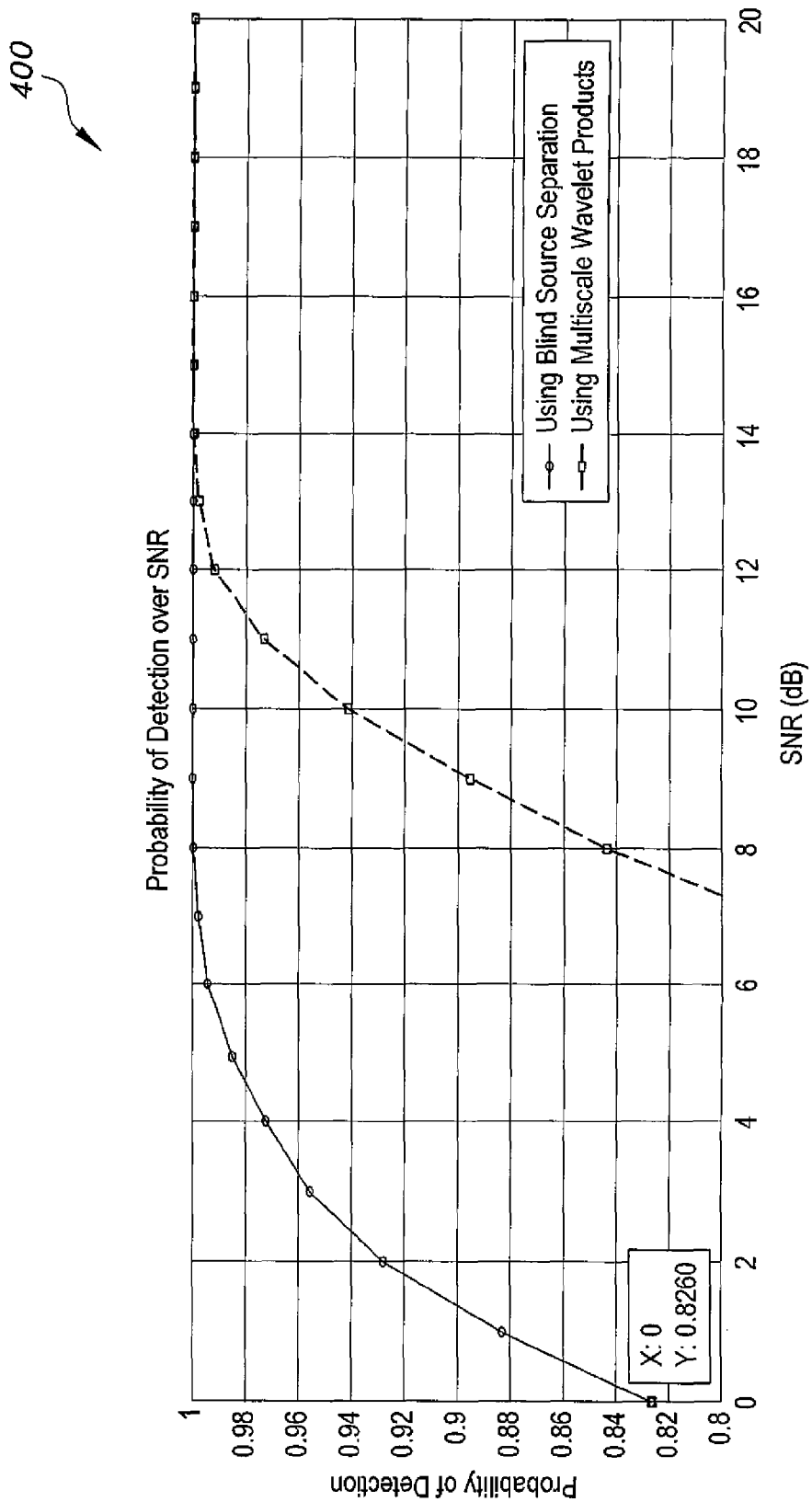
FIG. 4 is a plot showing probability of detection versus SNR for the peak detection method using blind source separation according to the present invention.

We studied the effect of noise on spectrum sensing performance. We calculated the success ratio and the probability of detection for each SNR value over 1000 realizations. The success ratio is defined as the probability of accurately detecting the frequency boundaries (i.e., the start and end of a frequency band) using the thresholding method, as described earlier. The probability of detection is based on the PSD value calculation within each band. Plot 300 of FIG. 3 shows the calculated success ratio for different SNR values and its comparison with related art multiscale wavelet product techniques. The present method showed improvement of 4 dB over the related techniques for a success ratio greater than 90%. Plot 400 of FIG. 4 shows the probability of detection versus SNR curve. The result shows that the present method gained 8 dB compared to the related techniques for a probability of detection greater than 90%.

In the present method, we proposed calculation of noise variance for detecting true peaks using the blind source separation method. This noise variance information is useful when the output of the edge detection technique contains noisy peaks along with true peaks. Noisy peaks are suppressed by thresholding the signal. This process directly affects the probability of detection of a primary user when performing spectrum sensing. The present method gained 4 dB in term of success ratio, and 8 dB in the probability of detection compared to the multiscale wavelet products technique, hence allowing cognitive radio devices to work efficiently on low power in a wideband regime. The present method will capture the interest of telecommunication equipment vendors, mobile phone manufacturers, and research institutes who are interested in bringing new era of wireless communication devices.

It is to be understood that the present invention is not limited to the embodiments described above, but encompasses any and all embodiments within the scope of the following claims.

We claim:

1. A peak detection method using blind source separation, comprising the steps of:
receiving mixed signals in a radio frequency (RF) receiver, the mixed signals including a wideband RF signal;
calculating a sample mean of the received wideband RF signal;
edge detecting the received wideband RF signal to provide a peak signal containing information regarding frequency band boundaries;
performing a blind source separation procedure on the peak signal to calculate an un-mixing matrix W;
estimating the source signals based on the un-mixing matrix, assuming a difference between the original received signal and an estimated source signal is a noise signal;
calculating a variance of the noise signal using a statistical combination of the blind source separation un-mixing matrix W and an output of the edge detecting step;
calculating a threshold value T for the mixed signals, the threshold calculation being based on the noise variance calculation;
applying the threshold value T to the resultant peak signal of the edge detecting step;
iteratively computing locations of the frequency band boundaries based on the step of applying the threshold; and
computing Power Spectral Density within the frequency band boundaries.

2. The peak detection method according to claim 1, wherein said edge detecting step further comprises the step of performing a continuous wavelet transform of the received signal, the continuous wavelet transform being characterized by the relation:

$$W_s S_r(f) = S_r(f) * \phi_s(f),$$

where $\phi_s(f)$ is the dilated wavelet smoothing function and '*' defines the convolution operator, and 's' depicts the dilation factor of a wavelet smoothing function, the dilation factor taking values in terms of power of 2.

3. The peak detection method according to claim 1, wherein said blind source separation procedure comprises the steps of:
characterizing the received signal according to the relation:

$$x_i(t) = \Sigma_{j=1}^n a_{ij} s_j(t),$$

where $a_{ij}$ represents the instantaneous mixing matrix (i, j) element;
further characterizing the received signal in vector form according to the relation:

$$x(t) = As(t),$$

where x(t) is a vector of the mixed signals;
formulating the blind source separation according to the relation:

$$y(t) = Wx(t) = WAs(t),$$

where y(t) is the estimate of the source signals, s(t);
computing a signal-to-noise ratio SNR based on a difference between the original wideband RF signal and the estimated signal, the SNR being characterized by the relation:

$$SNR = 10\log\frac{s \cdot s^T}{e \cdot e^T} = 10\log\frac{s \cdot s^T}{(s-y) \cdot (s-y)^T},$$

wherein an Eigenvalue matrix based on the SNR relation characterizes said un-mixing matrix calculation characterized by the relation:

$$(xx^T) \times W = ((\hat{x}-x)(\hat{x}-x)^T) \times W \times D,$$

where $\hat{x}$ is the moving average estimate of x; and
characterizing energy detection of the received signal according to the sample covariance matrix relation:

$$R_x(N) = R_s(N) + \sigma^2 I,$$

where $$R_x(N) = \frac{1}{N}\sum_{n=0}^{N-1} x(n)x^T(n),$$

and $$R_s(N) = \frac{1}{N}\sum_{n=0}^{N-1} s(n)s^T(n)$$

are the received and transmitted signal sample covariance matrices, respectively, and I is an identity matrix, $\sigma^2$ being the noise variance.

4. The peak detection method according to claim 3, wherein said noise variance calculation further comprises the step of calculating $\sigma^2 I$ according to the relation:

$$\sigma^2 I = \frac{1}{N}\sum_{n=0}^{N-1} x(n)x^T(n) - \frac{1}{N}\sum_{n=0}^{N-1} Wx(n)x^T(n)W^T.$$

5. The peak detection method according to claim 1, wherein said threshold calculation further comprises the step of calculating a normalized noise variance using a sample mean of the received signal using the relation:

$$T = \frac{\sigma^2}{\frac{1}{N}\sum_{n=0}^{N-1}|r(n)|}.$$

6. A computer software product, comprising a non-transitory medium readable by a processor, the non-transitory medium having stored thereon a set of instructions for performing a peak detection method using blind source separation, the set of instructions including:
  (a) a first sequence of instructions which, when executed by the processor, causes said processor to receive mixed signals including a wideband RF signal;
  (b) a second sequence of instructions which, when executed by the processor, causes said processor to calculate a sample mean of the received wideband RF signal;
  (c) a third sequence of instructions which, when executed by the processor, causes said processor to perform edge detection on the received wideband RF signal to provide a peak signal containing information regarding frequency band boundaries;
  (d) a fourth sequence of instructions which, when executed by the processor, causes said processor to perform a blind source separation procedure on the peak signal to calculate an un-mixing matrix W;
  (e) a fifth sequence of instructions which, when executed by the processor, causes said processor to estimate the source signals based on the un-mixing matrix, assuming a difference between the original received signal and the estimated signal is a noise signal;
  (f) a sixth sequence of instructions which, when executed by the processor, causes said processor to calculate a variance of the noise signal using a statistical combination of the blind source separation un-mixing matrix W and an output of the edge detection;
  (g) a seventh sequence of instructions which, when executed by the processor, causes said processor to calculate threshold value T for the mixed signals, the threshold calculation being based on the noise variance calculation;
  (h) an eighth sequence of instructions which, when executed by the processor, causes said processor to calculate a normalized noise variance;
  (i) a ninth sequence of instructions which, when executed by the processor, causes said processor to apply the threshold value T to the edge detection resultant peak signal;
  (j) a tenth sequence of instructions which, when executed by the processor, causes said processor to iteratively compute locations of the frequency band boundaries based on the threshold value application; and
  (k) an eleventh sequence of instructions which, when executed by the processor, causes said processor to compute Power Spectral Density within the frequency band boundaries.

7. The computer software product according to claim 6, wherein said third sequence of instructions further comprises a twelfth sequence of instructions which, when executed by the processor, causes said processor to perform a continuous wavelet transform of the received signal, the continuous wavelet transform being characterized by the relation:

$$W_s S_r(f) = S_r(f) * \phi_s(f),$$

where $\phi_s(f)$ is the dilated wavelet smoothing function and '*' defines the convolution operator, and 's' depicts the dilation factor of the wavelet smoothing function, the dilation factor taking values in terms of power of 2.

8. The computer software product according to claim 6, wherein said fourth sequence of instructions further comprises a thirteenth sequence of instructions which, when executed by the processor, causes said processor to characterize said received signal according to the relation:

$$x_i(t) = \sum_{j=1}^{n} a_{ij} s_j(t)$$

where $a_{ij}$ represents the instantaneous mixing matrix (i, j) element;
  further characterize the received signal in vector form according to the relation:

$$x(t) = As(t),$$

where x(t) is a vector of the mixed signals;
  formulate the blind source separation according to the relation:

$$y(t) = Wx(t) = WAs(t),$$

where y(t) is the estimate of the source signals, s(t);

compute a signal-to-noise ratio (SNR) based on a difference between the original wideband RF signal and the estimated signal, the SNR being characterized by the relation:

$$SNR = 10\log\frac{s \cdot s^T}{e \cdot e^T} = 10\log\frac{s \cdot s^T}{(s-y)\cdot(s-y)^T},$$

wherein an Eigenvalue matrix based on the SNR relation characterizes the un-mixing matrix calculation characterized by the relation:

$$(xx^T) \times W = ((\hat{x}-x)(\hat{x}-x)^T) \times W \times D$$

where $\hat{x}$ is the moving average estimate of x; and characterize energy detection of the received signal according to the sample covariance matrix relation, $$R_x(N) = R_s(N) + \sigma^2 I,$$

where $$R_x(N) = \frac{1}{N}\sum_{n=0}^{N-1} x(n)x^T(n),$$

and $$R_s(N) = \frac{1}{N}\sum_{n=0}^{N-1} s(n)s^T(n)$$

are the received and transmitted signal sample covariance matrices, respectively, and I is an identity matrix, $\sigma^2$ being the noise variance.

9. The computer software product according to claim 6, wherein said sixth sequence of instructions further comprises a fourteenth sequence of instructions which, when executed by the processor, causes said processor to calculate $\sigma^2 I$ according to the relation:

$$\sigma^2 I = \frac{1}{N}\sum_{n=0}^{N-1} x(n)x^T(n) - \frac{1}{N}\sum_{n=0}^{N-1} Wx(n)x^T(n)W^T.$$

10. The computer software product according to claim 6, wherein said eighth sequence of instructions further comprises a fifteenth sequence of instructions which, when executed by the processor, causes said processor to calculate said normalized noise variance using a sample mean of the received signal, the threshold T being characterized by the relation:

$$T = \frac{\sigma^2}{\frac{1}{N}\sum_{n=0}^{N-1}|r(n)|}.$$

* * * * *